United States Patent [19]

Meyer

[11] 4,136,969
[45] Jan. 30, 1979

[54] MIXING APPARATUS

[75] Inventor: Paul Meyer, Wiesbaden, Fed. Rep. of Germany

[73] Assignee: Frenkel C-D Aktiengesellschaft, Vaduz, Luxembourg

[21] Appl. No.: 813,702

[22] Filed: Jul. 7, 1977

[30] Foreign Application Priority Data

Jul. 14, 1976 [GB] United Kingdom ............... 29328/76
Jun. 14, 1977 [GB] United Kingdom ............... 25013/77

[51] Int. Cl.² .......................... A21C 1/06; B01F 7/08
[52] U.S. Cl. ..................................... 366/88; 366/89; 366/90; 366/99; 366/322; 366/323; 425/208
[58] Field of Search .............. 366/69, 77, 79, 99, 366/87–89, 90, 241, 247, 279, 310, 318, 336, 320–323, 339, 340; 425/207, 208

[56] References Cited

U.S. PATENT DOCUMENTS

| 1,904,844 | 4/1933 | Royle | 366/87 |
| 2,744,287 | 5/1956 | Parshall et al. | 425/208 |
| 2,765,491 | 11/1956 | Magerkurth | 366/87 |
| 3,102,716 | 9/1963 | Frenkel | 366/321 |
| 3,164,375 | 1/1965 | Frenkel | 366/89 |
| 3,788,614 | 1/1974 | Gregory | 366/87 |

Primary Examiner—Harvey C. Hornsby
Assistant Examiner—Timothy F. Simone
Attorney, Agent, or Firm—Diller, Ramik & Wight

[57] ABSTRACT

A continuous mixer comprising at least one mixing zone formed by a Transfermix geometry in which the number of starts of the helical thread changes for each of the components along the length of said Transfermix zone in the opposite sense to the change of the cross-sectional area of helical grooves on said component, whereby when in operation a medium moves along said Transfermix zone, portions thereof are successively transferred between the grooves of facing helical threads as giver and taker and whereby grooves of larger cross-sectional area are of greater widths than grooves of small cross-sectional area; in a preferred embodiment the mixer has a driven rotor and stationary barrel, the helical threads thereon being of opposite hand and the number of starts facing one another at any cross-section of the Transfermix zone is such as to make a substantially constant product.

17 Claims, 7 Drawing Figures

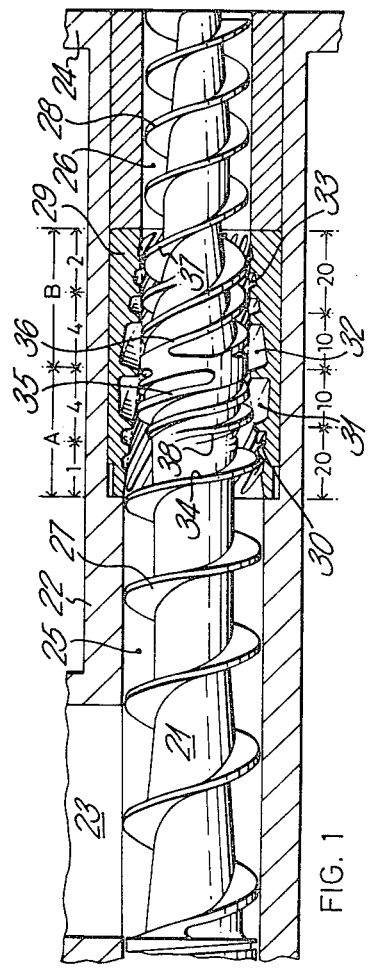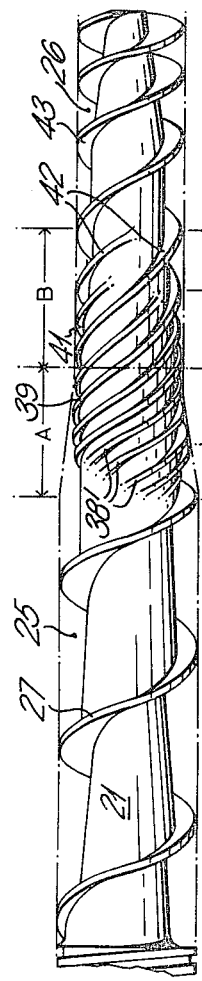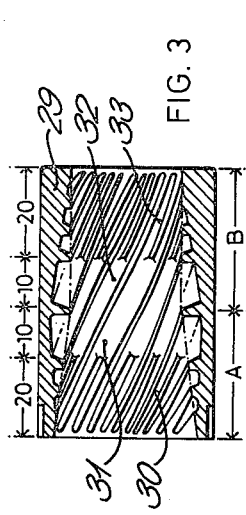
FIG. 1
FIG. 2
FIG. 3

MIXING APPARATUS

This invention relates to machinery for working or compounding one or more flowable media optionally in combination with powders, liquids or gases, where said flowable media may be of any consistency including that of a stream of discrete particles such as lumps or powders or that of a visco-elastic solid. It is particularly though not exclusively concerned with visco-elastic media such as rubber.

Continuously operating mixing machinery is known comprising a rotor and a barrel, the rotor having an external helical thread and the barrel having an internal helical thread of opposite hand to but coaxial with the helical thread on the rotor, where one of said threads may form part of an entry zone, the said threads together forming a mixing zone in which, over a given axial length, the thread in one component (e.g. in the rotor) varies from a full cross-sectional area to substantially zero cross-sectional area while the thread in the other component (e.g. in the barrel) varies from substantially zero cross-sectional area to full cross-sectional area and vice versa for a following mixing zone, if any. In operation a medium being transported or moved in the one component at the entry of said mixing zone will be transferred layer-by-layer from the one component (giver) to the other component (taker) into which substantially all the medium will have been transferred by the end of the mixing zone, the medium having been mixed and worked layer-by-layer during this transfer in accordance with the conditions of relative motion between the two components.

On account of this action, the geometry of such a mixing zone has become known in the art as a Transfermix geometry and a device incorporating such a mixing zone or zones as a Transfermix.

A Transfermix geometry does not depend upon a relative rotation between the two components for its essential mixing action but will operate also with the two components having no rotation relative to one another and the medium being pumped through it. For example, a Transfermix geometry can be formed by a system of vanes within an annular conduit where a medium is pumped or otherwise moved therethrough with the purpose of heat exchange through or with said annular walls with said vanes extending from said annular walls in that case operating as secondary heat transferring walls. In such a Transfermix heat exchange device, a liquid or a gas may be the medium with or without a loading of a powder, and a change of state of the medium may also take place.

A Transfermix geometry may thus more generally be defined as: a continuous mixing device comprising a component having an internal operating surface provided with a helical thread and an interior component having an external operating surface provided with a helical thread of different direction from, but coaxial with, said helical thread on said internal operating surface, the said threads facing one another and defining a passage for a medium to be mixed (mixing zone); the envelope of revolution defined by the crown or land of said interior thread being coincident with or a short radial distance within the envelope of revolution defined by the crown or land of said exterior thread, the cross-sectional areas of the grooves of said facing threads varying in opposite senses between a maximum and a minimum value for each said thread along substantially the same length of the said passage, whereby when in operation a medium moves along said passage, portions thereof are successively transferred between the grooves of said facing helical threads as giver and taker respectively and experience at least a change of flow-direction and of their relative positions in the total flow, on so being transferred.

A Transfermix geometry may most generally be regarded as a device for continuously applying a surface-effect and/or an edge-effect to a bulk flow of a medium for bringing about a step-wise change in a property of said bulk flow to a certain degree of uniformity.

In this sense, heat-transfer is an example of a surface-effect. The application of shear-forces will be, depending on the consistency of the medium, an edge-effect or a combined edge- and surface-effect. For the initial plastification of a rubber compound from cold, we are considering a 'scissors-type' action between crossing thread-lands of the two components. Where shear-work is put into a viscous flow, there is a combined edge- and surface-effect in that a thread-land of one component moves across a channel of the other component and the shear-stress is transferred through the medium. In this case, the width-to-depth ratio of the said helical channel becomes a factor in the effectiveness of application of shear-stress and thus of the pumping action.

Bulk flow is defined as the total flow in both components at any cross-section, this being a multiple of that part of the flow which is being transferred from one component to the other at that cross-section and which is being moved most intensively on being thus transferred. This among other features differentiates a Transfermix geometry from any colloid-mill type device in which the flow being worked is substantially identical with the total flow being pumped.

By arranging Transfermix geometries in sequence, required degrees of intensification of a surface- and/or edge-effect may be obtained on a bulk flow or different effects may be applied to a bulk flow in sequence, each to a degree of uniformity determined by the geometry. As one of many possible examples may be quoted a rubber or plastics compounding extruder, providing plastification or melting in one or more mixing zones, with shear-working and heat transfer, together with compounding and pressure build-up for extrusion in a following mixing zone or zones. An example of a simple edge-effect is 'chemical contacting', where a catalyst may be arranged along the edge of a thread-land.

Surface- and edge-effects are so called because their intensity is a maximum at the surface or edge of application with the intensity dropping off with distance into the bulk flow. The surface of revolution through which in a Transfermix geometry the transfer of the medium takes place from the one into the other component, may be considered to be subdivided by the threads of the helical channels crossing one another. The more helical threads are provided on one or both of the components, the smaller will be subdivisions of said transfer surface and therefore the more uniform the application of the said edge- and/or surface-effects will be.

There are, however, limits to the multiplication of helical threads in each component because each thread must have a minimum land width for strength and the more helical channels are provided to carry the bulk flow, the narrower each single channel will be until a stage is reached where the throughput will be materially reduced. For a relative rotation of the components providing the pumping action, the transfer of shear-stress and thus forward motion into the depths of such channels may fail, leading to stoppages or back-flow there and in a stationary Transfermix geometry the resistance to pumping may become excessive.

For a Transfermix geometry, the extreme depths of channels will occur at opposite ends of the mixing zone for each of the components which, however, makes the limitation no less effective.

Such limiting effects will be easily understood with reference to Transfermix geometries of larger dimensions which are scaled up from smaller versions which may have been adequate for a required purpose.

For example, if the leading diameter and length as well as the annular depth of a Transfermix geometry are doubled, the area of the Transfer surface will be guadrupled. Retaining the same number of helical channels in each component as would happen in a true geometric scale-up with width-to-depth ratio of the channels the same, the number of subdivisions of the Transfer-surface will be quartered, i.e., divided by four.

If, on the other hand, the number of helical channels in each component is doubled, the number of subdivisions of the transfer zone will be raised to the same value as in the small Transfermix, but the width-to-depth ratio of the individual channels will have been halved, leading to the above-described loss of throughput and of general flow properties.

The above considerations explain scale-up difficulties which have been observed on Transfermix for example in application as cold-feed rubber extruders, as well as limitations on the performance of smaller units in this and other applications. Such effects are not limited to the more heavily viscous materials, though in more easily flowable materials the shortcomings may not have been recognised as such, but rather can be shown as improvements not hitherto capable of realisation.

It is an object of this invention to provide a Transfermix geometry in which the uniformity (quality) of application of edge- and/or surface-effects as indicated by the number of subdivisions of the transfer zone, can be increased without reducing the rate of bulk flow by the occurrence of unfavourable width-to-depth ratios in individual helical channels.

It is a further object of this invention to provide a Transfermix geometry which can be scaled up on its leading dimensions while maintaining a required uniformity (quality) of application of edge- and/or surface-effect as indicated by the number of subdivisions of the transfer-surface without a disproportionate reduction in the rate of bulk flow by the occurrence of unfavourable width-to-depth ratios of individual helical channels.

In relation to Transfermix geometries as applied to rubber and plastics extruders particularly of the cold-fed types, it is an object of this invention to achieve plasticisation and/or melting with low length-to-diameter ratios also for compounds which have hitherto proved difficult to plasticise in other than high length-to-diameter screw devices which incur the danger of a generalised or localised overheating.

In these applications, it is a further object of the invention to achieve scale-up on the same leading dimensions without loss of quality and/or output.

In order to achieve the above objects, the present invention provides a continuous mixer comprising at least one mixing zone formed by a Transfermix geometry (as hereinbefore defined) in which the number of starts of the helical thread changes for each of the components along the length of said Transfermix zone in the opposite sense to the change of the cross-sectional area of helical grooves on said component, whereby when in operation a medium moves along said Transfermix zone, portions thereof are successively transferred between the grooves of facing helical threads as giver and taker and whereby grooves of larger cross-sectional area are of greater widths than grooves of small cross-sectional area.

In preferred embodiments of this invention, the minimum values of groove cross-sections for each of said threads is substantially zero, the said threads are of opposite hand and the product of the number of starts in one said thread and the number of starts in the other said thread at any cross-section along substantially the whole length of said passage is constant.

At least one of said components may be rotatably mounted and driven to effect forward motion of said medium through said passage, the said rotatable component having maximum groove cross-sectional area at the beginning of said passage and correspondingly a minimum number of thread-starts, and in advance of said passage, a transporting helical thread, having at least one start.

For embodiments adapted to media entering a mixing zone in the form of a visco-elastic solid in a transport helical thread, an increase in the number of starts of said thread in excess of doubling will, in a preferred embodiment, commence with one additional thread arising gradually near the leading surface of said transport thread followed by a second such additional thread at a farther distance along said length and away from said leading thread surface until the full number of starts is reached, whereby in operation a blockage of the flow of said solid is avoided in the said component and a transfer into the maximum number of grooves of the other component with effective subdivision and plasticisation is achieved.

The invention will now be described by way of example and in some detail with reference to the accompanying drawing in which:

FIG. 1 is a sectional view of an embodiment of the invention as a cold feed rubber extruder with two Transfermix sections;

FIG. 2 shows an alternative version of the Transfermix geometries of the rotor of FIG. 1;

FIG. 3 is a sectional view of a barrel sleeve forming the Transfermix part of the embodiment of FIG. 1;

Figure 4:
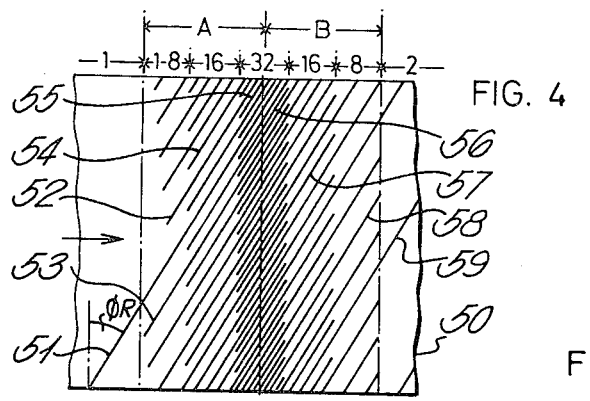
FIG. 4 is a developed view of a rotor with two Transfermix sections with a multiple of the number of starts of the embodiments of FIGS. 1-3.

In the cold feed rubber extruder of FIG. 1, the rotor 21 is rotatably mounted in the known manner in the barrel housing 22. This has an inlet opening 23 and an outlet flange 24 and both barrel and rotor have heating and cooling provisions as known in the art. Fixed to the outlet flange there could be known exit devices such as an extrusion head, a screen pack, a pelletising head, fixed cutter knives or the like.

The rotor comprises a feed- and compression-section 25 with a single-start helical thread 27 which leads up to the first Transfermix zone A and an exit section 26 with a two-start helical thread 28 following the second Transfermix zone B. Both rotor sections 25 and 26 run in cylindrical parts of the barrel-housing. The feed section 27 may be provided with known aids to forward transport of unplasticised rubber, such as fluting.

In the first Transfermix zone A the barrel sleeve 29 has a first section with a 20-start thread 30 and a second section with a 10-start thread 31 while in the second Transfermix zone B there is a sleeve section with a 10-start thread 32 followed by a sleeve section with a 20-start thread 33, the starts of the threads and the extent of these sections being shown below the barrel.

The rotor continues with a single-start thread 34 in a first section and builds up to a 4-start thread 35 in this section to continue as such up to the position of zero cross-sectional area at the end of Transfermix zone A. In Transfermix zone B the rotor starts with a sectional 4-start thread 36 and ends with a sectional 2-start thread 37, this carrying on beyond the end of Transfermix zone B as the outlet section 26 with its 2-start thread 28.

Regarding now the numbers of thread starts shown for the barrel below and for the rotor above the Figure, it will be seen that these vary in complementary fashion according to the invention along the length of each Transfermix zone.

The first section from single-start thread 34 of the rotor to 4-start thread 35 shows the gradual build-up from single- to 4-start threads which according to this invention, commences near the leading edge of the single thread and new starts 38 are stepped gradually or staggered along the section and across the width of the single groove originally formed by the 1-start thread. This avoids a hold-up of the as yet hardly plasticised rubber which would occur if the three additional thread starts were to arise abruptly at the same cross-section.

FIG. 2 shows an alternative embodiment of a rotor 21, like numerals denoting like parts, in which in Transfermix zone A eight starts 38' build up in gradual steps along and across the channel formed by the original single-start thread 27 and continue as the 8-start thread 39 up to the end of Transfermix zone A. In contrast to the embodiment of FIG. 1, the groove cross-sections formed by 8-start thread 39 do not reduce to zero, but to a minimum value and in Transfermix zone B increase again through the continuation of 8-start thread 41 into Transfermix zone B. This reduces to the 4-start thread 42 leading up to the end of Transfermix zone B. Thereafter the exit section 26 of the rotor continues with a 2-start thread 43.

The numbers of starts in the different sections is indicated below the rotor of FIG. 2

FIG. 3 shows the barrel sleeve of FIG. 1 taken out of the housing and without the rotor, to clarify its structure, like numerals denoting like parts and the numbers of starts as well as their extent being indicated above FIG. 3.

In operation, a feed of unvulcanised rubber in the form of strip, particles (pellets) or powder is introduced into the opening 23 and transported by the rotor 21 towards the first Transfermix zone A, while being compressed to eliminate air.

On entering the Transfermix zone A, the outermost layers of the flow in the rotor are transferred into the twenty starts of the stator thread 30 which commence from zero depth up to the depth-to-width ratio in the plane of the drawing of about unity. During this transfer those layers are thus subdivided and sheared for plasticisation by the relative rotation, while in the shallow barrel grooves effective forward transport takes place as a result of the same relative rotation. There are $1 \times 20 = 20$ points of intersection of thread-lands or "cut points" for scissors action at each cross-section here.

In the helical channel of the rotor, the new thread-start 34 emerging near the landing edge of the original single-start thread 27 penetrates into the flow of rubber, subdividing the as yet hardly plasticised material and spreading it across the helical channel as do the other two emergent starts 34 stepped both across and along the helical channel. Thereby the forward flow in this helical channel is not obstructed but is spread across towards the trailing edge of the original helical channel where there is a reduced pressure and, depending on conditions, there is free space for the feed rubber to spread into.

After the gradual emergence of the three starts 34, the flow in the rotor will thereafter be in four parallel helical grooves 35 which will be full and which at their deepest points will have started from a width-to-depth ratio of about unity for good forward transport.

During development work for this invention, the additional three starts 34 were first made to emerge at the beginning of mixing zone A and this resulted in much reduced throughput. Also making one thread-start emerge at the beginning of Transfermix zone A to halve the original groove, and a little further along making the other two thread-starts emerge to halve each of the two helical channels, resulted in considerably reduced throughput. This led to the stepwise emergence of additional threads for this case of plasticising rubber which may similarly apply to the melting of plastics but which may be less necessary for a medium which enters the mixing zone A already in a flowable state.

Opposite the 4-start rotor thread 35 there is the 10-start barrel thread 31 having a groove width wider than the maximum groove depth which is a good condition for forward pumping effect. It will be seen that at each circumference here there are $4 \times 10 = 40$ intersections of thread-lands or "cut points" for scissors action in each cross-section for bringing about a required uniformity of application of shear working as well as good forward transport. At the end of Transfermix zone A all layers of the rubber originally moving in the rotor will have been transferred into the ten helical barrel grooves, having been worked to a degree of uniformity determined mainly by the number of "cut points".

Analogously, there will be seen to be in Transfermix zone B, owing to the changes of numbers of starts, also $4 \times 10 = 2 \times 20 = 40$ "cut points" at each cross-section, determining the uniformity of shear application to a certain level.

With the rotor of FIG. 2 in place of the 4-start rotor of FIG. 1, the number of "cut points" at each cross-section will correspondingly be:

$$4 \times 20 = 8 \times 10 = 10 \times 8 = 20 \times 4 = 80$$

for all parts of the Transfermix zones A and B, where we treat the "emergent" 8-start thread on the rotor as an average 4-start thread.

It has been found that in a small size Transfermix such as 3.25 inch or 82 mm diameter in which it is possible also to realize an 80 cut point per cross-section geometry without changing the numbers of starts according to this invention, that is to say by having a barrel sleeve with twenty starts all along its length and a rotor with two starts, making $2 \times 20 = 20 \times 2 = 80$ cut point per cross-section, the results obtained on cold feed extrusion of a high performance truck tread compound containing a substantial proportion of natural rubber (over 50 per cent) were markedly inferior. In fact, applying the provisions of this invention provided an over 50 percent increase in output of very smoothly extruded tread from 400 kg per hour to 630 kg per hour and at about 5° C lower extrudate temperature, although the rotor speed could be increased from 86 to 108 revolutions per minute.

The number of cut points per circumference will serve, within limits, to differentiate Transfermix geometries of the same diameter, but for comparing Transfermix geometries of different sizes it is advisable to use "subdivision of circumference" as a characterising length. For example, for the 80 cut points on a 3.25 inch diameter this would be the circumference of $$10.21 \text{ inches}/80 = 0.128 \text{ inches} = 3.24 \text{ mm}.$$

This would be the length of subdivision of circumference one would use as a guide towards obtaining a similar performance on scaling up a cold feed Transfermix extruder, at least in the first or plasticising Transfermix zone A.

FIG. 4 shows, as a developed view, a rotor 50 with feed section 1 having a single-start thread 51 which at entry into the Transfermix zone A becomes an 8-start thread 52 with a stepwise transition 53 commencing at the leading edge of the single start thread, similarly as described with reference to FIGS. 1 and 2. Proceeding further into the Transfermix zone, the 8-start thread subdivides by regularly distributed doubling into a 16-start thread 54 and farther along this subdivides similarly into a 32-start thread 55, corresponding to reducing groove depths towards the end of Transfermix zone A with substantially zero groove cross-section.

In Transfermix zone B there is first the 32-start thread 56, going by regularly distributed halving to 16-start thread 57 and similarly to 8-start thread 58 towards the end of Transfermix zone B, to continue as 2-start thread 59 in the exit zone.

Figures 5, 7:
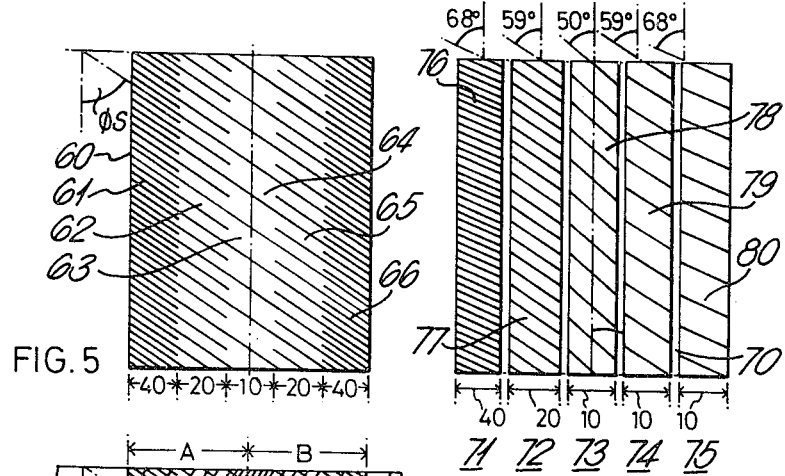
FIG. 5 is a developed view of the barrel sleeve forming the Transfermix part with a multiple of the number of starts of the embodiment of FIGS. 1 & 3 for use with the geometry of FIG. 4.
FIG. 7 is a developed view of part of a barrel sleeve similar to FIG. 5 but formed of an assembly of separately manufactured rings each having a differend number of helical threads at different helix angles.

In FIG. 5 is shown in developed view a corresponding barrel sleeve 60 commencing at the beginning of Transfermix zones A with a 40-start thread 61 at minimum depth, followed by a 20-start thread 62 and a 10-start thread 63 by the end of Transfermix zone A. In Transfermix zone B we have conversely the 10-start thread 64 of maximum groove depth, followed by the 20-start thread 65 and 40-start thread 66 of reducing groove depths.

Figure 6:
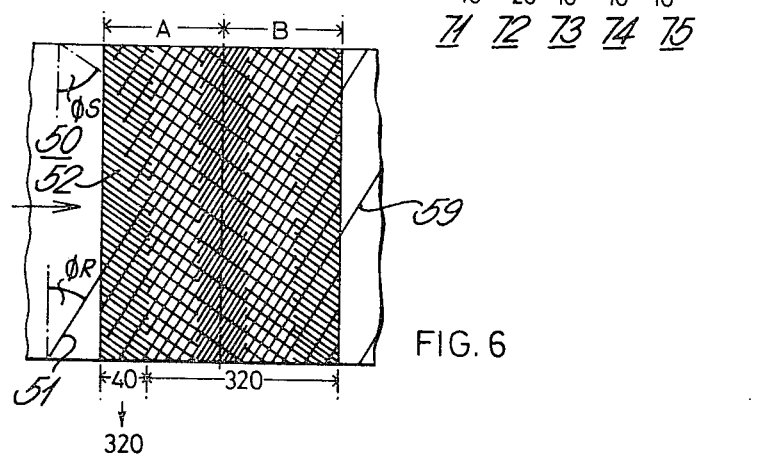
FIG. 6 is a view of the developed rotor of FIG. 4 and of the developed barrel sleeve of FIG. 5 superimposed to illustrate the Transfermix geometry with many starts for improved uniformity without loss of throughput and which could also represent a scale-up of the embodiment of FIGS. 1-3.

FIG. 6 is the superimposition of FIGS. 4 and 5 which shows that except for the emergent 8-start thread 52 at the very beginning of Transfermix zone A, where the cut points increase from 40 to 320, the rest of the Transfermix zones A and B have 320 cut points per circumference, using helical grooves which get wider with increasing depth and vice versa for keeping up the conditions for good forward transport.

Using the subdivision length determined for the 3.25 inch Transfermix of 0.128 Inch, we can calculate the circumference of the larger Transfermix having 320 cut points for equivalent plastification conditions, as $320 \times 0.128$ inch = 40.96 inches or the diameter as $$320/80 \times 3.25 \text{ inch} = 13 \text{ inches}.$$

Taking into account that rubber extruders are operated mostly on constant circumferential speed so that residence time increases with the leading dimension, the influence of this factor will permit a bigger Transfermix to be made with this geometry for equivalent performance.

FIG. 7 shows diagrammatically five separate rings 71, 72, 73, 74 and 75 which are made to be joined together to form a barrel sleeve 70. This assembly of rings, similarly to barrel sleeve 60 will be inserted into the barrel of the Transfermix where the rings can be keyed with the barrel or with each other or both to take up the torque transmitted by the medium during operation and thus to prevent rotation.

Ring 71 has a 40-start thread 76 with a helix-angle of 68°, ring 72 a 20-start thread 77 with a helix angle of 59°, ring 73 a 10-start thread 78 with a helix angle of 59°, and rings 74 and 75 have 10-start threads 79 and 80 with helix angles of 59° and 68° respectively.

This indicates that, depending on the nature of the surface-effect it is intended to apply, for example shear with a material which reduces in viscosity fairly quickly with plasticisation, one can use a change of helix angle towards 45°, the angle of maximum forward transport (sin 45° × cos 45° is a maximum) to keep the helical grooves shallower, and thereby the width-to-depth ratio of the grooves higher, in addition to reducing the number of threads with increasing groove depth.

In the barrel sleeve 70, the second mixing zone will be seen to have a 10-start thread only, though with stepwise changing helix angles from ring to ring. Together with this barrel could be used a rotor having, for example, an 8-start thread for a Transfermix in which the first or plasticising mixing zone has a 320 cut point geometry and a second mixing zone has an 80 cut point geometry for less work input into an already plasticised material.

Similarly as with barrel sleeves, rotors can be made up of rings having, in that case, their sections of helical threads on their outsides and which are then fitted together, for instance on an internal spindle while also being keyed together for transmission of torque.

Making up rotors or barrel sleeves from ring sections will be advantageous for bigger sized units, as such rings can be manufactured more easily and this might well compensate for the additional work of making the rings fit together properly and making certain that heating and cooling can be accomplished without leakages.

Morever Transfermix parts of rotors and barrel inserts can then be made from ring-sections kept in stock, to build up different Transfermix geometries needed.

When making Transfermix geometries out of rings these can be designed for assembly in different relative angular positions so that potentially continuous threadstarts may or may not register with each other.

If the thread-starts are arranged out of register with each other, additional stream-splitting features can be introduced. These could also be realised in Transfermix not made up of rings.

What is claimed is:

1. A continuous mixer comprising at least one mixing zone formed by a Transfermix geometry, said Transfermix geometry being defined by an exterior component having an internal operating surface provided with a first helical thread and an interior component having an external operating surface provided with a second helical thread of different direction from but coaxial with said first helical thread, said first and second helical threads facing one another and defining therebetween said one mixing zone, said first and second helical threads defining respective first and second helical grooves therebetween of predetermined cross-sectional areas, each of said first and second helical threads having starts, the number of said starts of said first and second helical threads change at different locations for each of said interior and exterior components along the length of said Transfermix zone in the opposite sense to the change of the cross-sectional area at different locations of said helical grooves on said interior and exterior components whereby when in operation a medium moves along said Transfermix zone and portions thereof are successively transferred between the grooves of facing helical threads, and grooves of larger cross-sectional area are of greater widths than grooves of small cross-sectional area.

2. A continuous mixer as claimed in claim 1, in which the helical threads in the components in the Transfermix zone are of opposite hand and the number of starts facing one another at any cross-section of the Transfermix zone is such as to make a substantially constant product.

3. A continuous mixer comprising a driven rotor and a stationary barrel each having a helical thread, said stationary barrel having an entry-opening, said rotor helical thread being opposite said entry-opening in said barrel and forming with said barrel helical thread at least one mixing zone of Transfermix geometry with said rotor and barrel threads being opposite handed threads, said rotor and barrel threads having starts, said rotor and barrel threads facing one another and defining therebetween said one mixing zone, said rotor and barrel threads defining respective rotor and barrel helical grooves therebetween of predetermined cross-sectional areas, the number of said starts of the helical thread in each of said rotor and barrel changes at different locations in the opposite sense to the change of cross-sectional area at said different locations of grooves in each said rotor and barrel, whereby when in operation a medium is moved along said Transfermix zone, portions thereof are successively transferred between the grooves of facing helical threads and grooves of larger cross-sectional area are of greater width than grooves of small cross-sectional area.

4. A continuous mixer as claimed in claim 3, in which the number of starts facing one another at substantially any cross-section of said Transfermix zone make a constant product.

5. A continuous mixer as claimed in claim 3, in which subsections of the Transfermix zone of the rotor or of the barrel are formed of separate rings.

6. A continuous mixer as claimed in claim 5, in which rings are assembled in relative angular positions such that potentially continuous thread-starts are out of register with each other.

7. A continuous mixer as claimed in claim 3, in which subsections of the Transfermix zone of the rotor or of the barrel are formed of separate rings each having a different number of threads, the said change of number of starts being effected by the sequence of said rings in the rotor or barrel assembly.

8. A continuous mixer as claimed in claim 3, in which subsections of the Transfermix zone are formed of separate rings each having a different number of threads of different helix angle, the said change of number of starts being effected by the sequence of said rings in the rotor or barrel assembly.

9. A continuous mixer as claimed in claim 3, in which on entry into the Transfermix zone the number of starts on said rotor increases in excess of becoming double through commencing with one additional thread arising gradually nearer the leading surface of an existing thread than the trailing surface of a thread defining the other side of the helical groove, followed by a second thread arising gradually at a position further into the Transfermix zone and away from said leading edge until the full number of starts is reached, whereby in operation the medium is subdivided in and also spread across the original groove.

10. A continuous mixer comprising a driven rotor and a stationary barrel each having a helical thread, said stationary barrel having an entry-opening, said rotor helical thread being opposite said entry opening in said barrel and forming with said barrel helical thread at least two mixing zones of Transfermix geometry, and an exit zone with the helically threaded rotor and a cylindrical barrel section, within said Transfermix zones said rotor and barrel threads being opposite-handed, said rotor and barrel threads facing one another and defining therebetween said one mixing zone, said rotor and barrel threads defining respective rotor and barrel helical grooves therebetween of predetermined cross-sectional areas, the number of helical starts on the rotor in the first Transfermix zone increases as the total cross-section of the helical grooves of the thread on the rotor decreases towards zero and conversely the number of starts in the barrel decreases as the cross-section of the helical grooves of the thread on the barrel increases from substantially zero near the entry towards its maximum value at the end of the first said mixing zone, the ratio of helical groove width to helical groove depth being for all helical grooves at least a predetermined value.

11. A continuous mixer as claimed in claim 10, in which in the second Transfermix zone the number of starts on the rotor decreases as the groove cross-sectional area increases and the number of starts in the barrel increases as the groove cross-sectional area decreases towards zero.

12. A continuous mixer as claimed in claim 10, in which the number of starts in the rotor increases by more than double after entry into the first Transfermix zone and thereafter increases by regularly distributed doubling to its maximum value and in which the number of starts in the barrel decreases by regularly distributed halving to its minimum value, the said doublings and halvings of the number of starts taking place substantially at corresponding cross-sections of the Transfermix zones.

13. A continuous mixer as claimed in claim 10, in which in the second Transfermix zone the number of starts on the rotor decreased as the groove cross-sectional area increases and the number of starts in the barrel increases as the groove cross-sectional area decreases towards zero and in which in the first Transfermix zone the number of starts increases by more than double in gradual steps spaced from the leading face of the thread entering the Transfermix zone and from the entry cross-section of the first Transfermix zone and thereafter increases by regularly distributed doubling to its maximum value where the groove cross-sectional area has a minimum value and thereafter decreases by regularly distributed halving, and in which the number of starts in the barrel decreases by regularly distributed halving in the first Transfermix zone and increases by regularly distributed doubling in the second Transfermix zone, the said doublings and halvings of said numbers of starts taking place substantially at corresponding cross-sections of the Transfermix zones.

14. A continuous mixer as claimed in claim 10, in which subsections of the Transfermix zone of the rotor or the barrel are formed of separate rings.

15. A continuous mixer as claimed in claim 10, in which the number of starts in the rotor increases by more than double after entry into the first Transfermix zone and thereafter increases by regularly distributed doubling to its maximum value and in which the number of starts in the barrel decreases by regularly distributed halving to its minimum value, the said doublings and halvings of the number of starts taking place substantially at corresponding cross-sections of the Transfermix zones, and in which the said cross-sections define separation planes between rings from which barrel or rotor are put together and where such a ring may have a fixed number of helical starts.

16. A continuous mixer as claimed in claim 10, in which the number of starts in the rotor increases by more than double after entry into the first Transfermix zone and thereafter increases by regularly distributed doubling to its maximum value and in which the number of starts in the barrel decreases by regularly distributed halving to its minimum value, the said doublings and halvings of the number of starts taking place substantially at corresponding cross-sections of the Transfermix zones, and in which the said cross-sections define separation planes between rings from which barrel or rotor are put together and where such a ring may have a fixed number of helical starts, and may have a different helix angle to an adjacent ring.

17. A continuous mixer as claimed in claim 10, in which in the second Transfermix zone the number of starts on the rotor decreases as the groove cross-sectional area increases and the number of starts in the barrel increases as the groove cross-sectional area decreases towards zero and in which in the first Transfermix zone the number of starts increases by more than double in gradual steps spaced from the leading face of the thread entering the Transfermix zone and from the entry cross-section of the first Transfermix zone and thereafter increases by regularly distributed doubling to its maximum value where the groove cross-sectional area has a minimum value and thereafter decreases by regularly distributed halving, and in which the number of starts in the barrel decreases by regularly distributed halving in the first Transfermix zone and increases by regularly distributed doubling in the second Transfermix zone, the said doublings and halvings of said numbers of starts taking place substantially at corresponding cross-sections of the Transfermix zones, and in which the said cross-sections define separation planes between rings from which barrel or rotor are put together and where such a ring may have a fixed number of helical starts.

* * * * *

UNITED STATES PATENT OFFICE
CERTIFICATE OF CORRECTION

PATENT NO. : 4,136,969
DATED : Jan. 30, 1979
INVENTOR(S) : Paul Meyer

It is certified that error appears in the above-identified patent and that said Letters Patent are hereby corrected as shown below:

---[73]  Assignee: Frenkel C-D Aktiengesellschaft,
         Vaduz, Liechtenstein ---

Signed and Sealed this

Sixth Day of November 1979

[SEAL]

Attest:

RUTH C. MASON
Attesting Officer

LUTRELLE F. PARKER
Acting Commissioner of Patents and Trademarks